E. L. McCASLIN.
DIRIGIBLE LIGHT FOR AUTOMOBILES.
APPLICATION FILED AUG. 4, 1916.
1,213,220.
Patented Jan. 23, 1917.
2 SHEETS—SHEET 1.
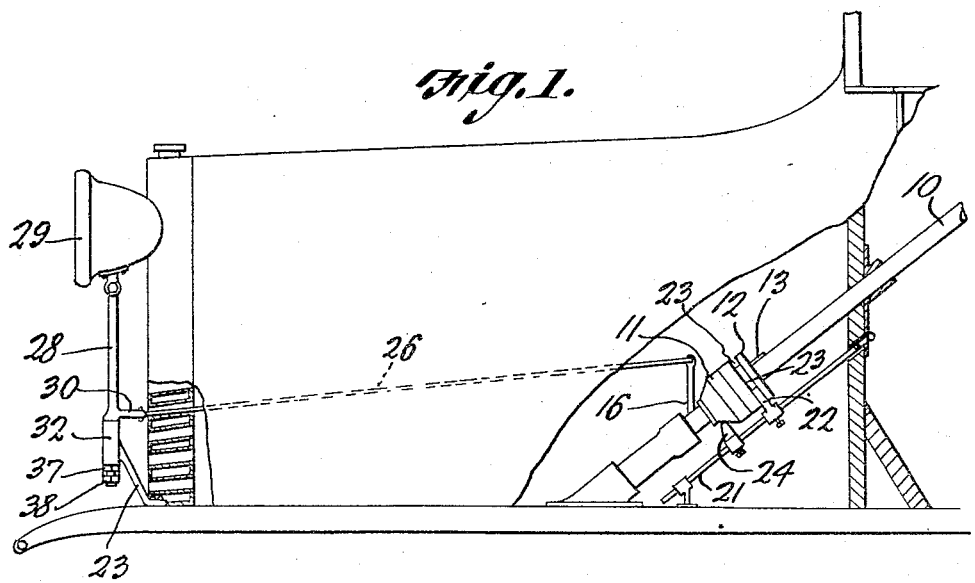
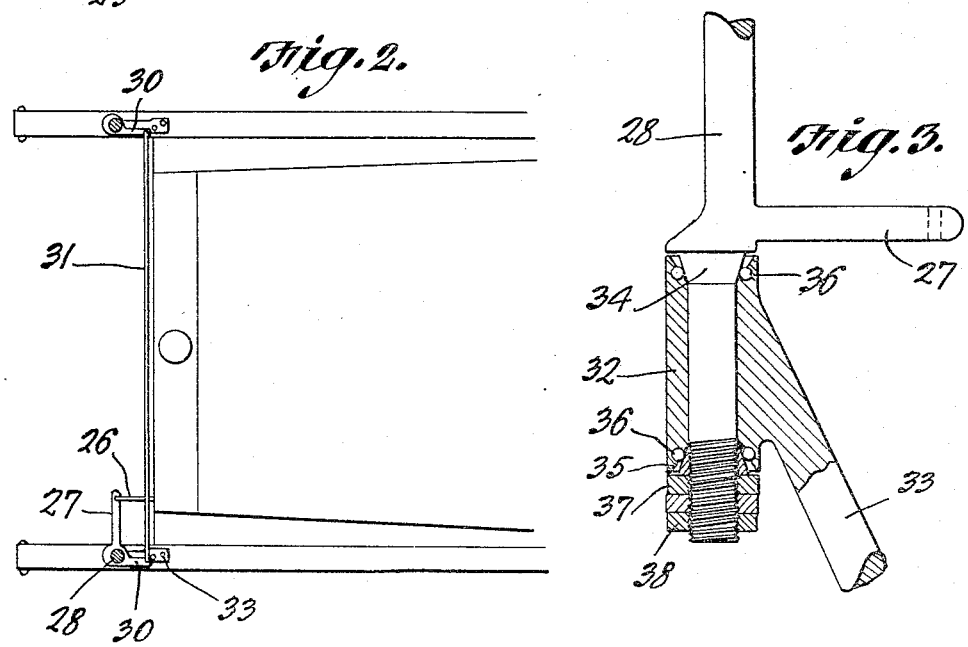
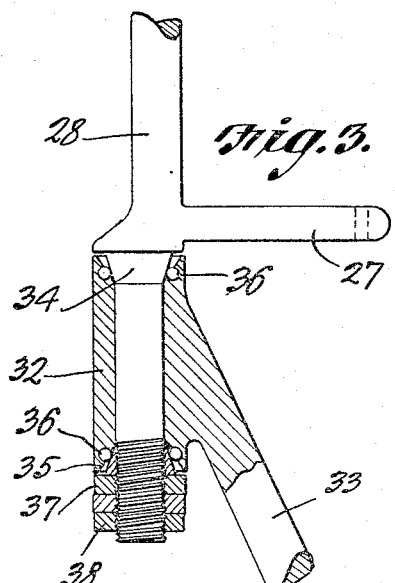
Witnesses
E. L. McCaslin
Inventor
by
Attorneys E. L. McCASLIN.
DIRIGIBLE LIGHT FOR AUTOMOBILES.
APPLICATION FILED AUG. 4, 1916.
1,213,220.
Patented Jan. 23, 1917.
2 SHEETS—SHEET 2.
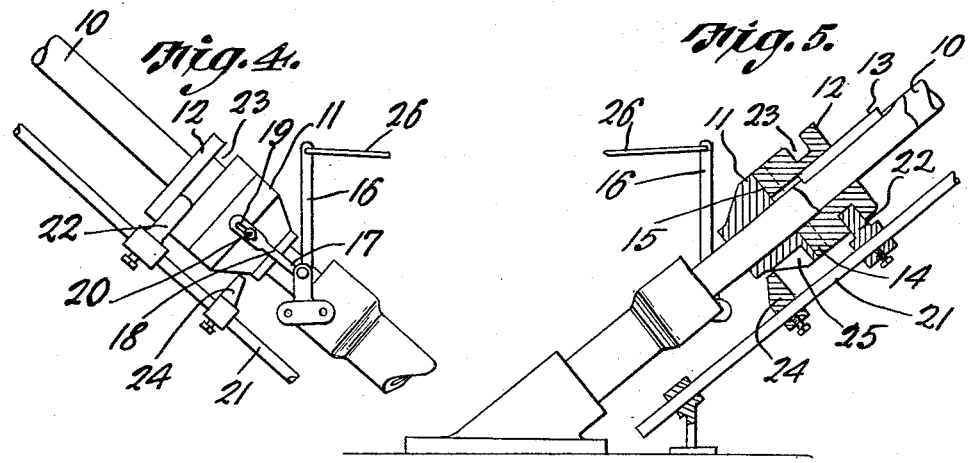
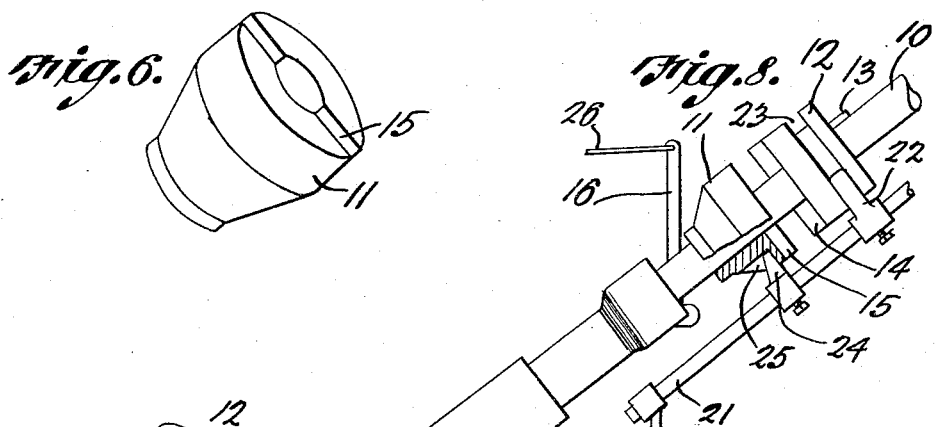
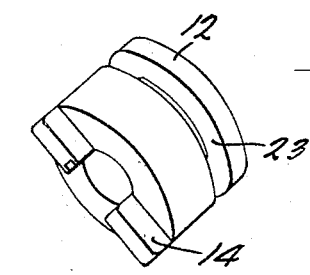
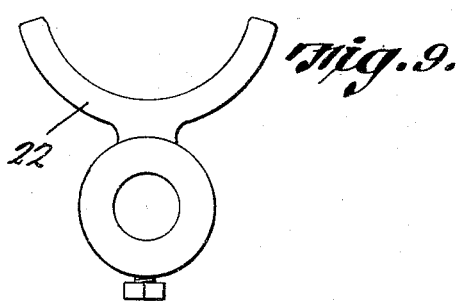
Witnesses
E. L. McCaslin, Inventor
by C. A. Snow & Co.
Attorneys

UNITED STATES PATENT OFFICE.

ELMER L. McCASLIN, OF SALINA, KANSAS, ASSIGNOR OF ONE-HALF TO FRED C. SKINNER, OF WEBB, CANADA.

DIRIGIBLE LIGHT FOR AUTOMOBILES.

1,213,220.  Specification of Letters Patent.  Patented Jan. 23, 1917.

Application filed August 4, 1916. Serial No. 113,162.

*To all whom it may concern:*

Be it known that I, ELMER L. MCCASLIN, a citizen of the United States, residing at Salina, in the county of Saline and State of Kansas, have invented a new and useful Dirigible Light for Automobiles, of which the following is a specification.

The object of the invention is to provide a simple and relatively inexpensive device whereby the headlights of an automobile or similar vehicle may be turned in the direction in which the steering wheels are being turned without special attention on the part of the driver; and also to provide means whereby with facility the headlight directing means may be disconnected and the headlights locked in their normal or straight forward positions.

Further objects of the invention will appear as the description proceeds, it being understood that changes in the precise embodiment of the invention herein disclosed, can be made within the scope of what is claimed, without departing from the spirit of the invention.

In the drawings:—Figure 1 is a side view partly in section of an automobile hood with a headlight directing means embodying the present invention, shown in operative position. Fig. 2 is a plan view showing the connections with the headlight bar. Fig. 3 is a detail sectional view of the mounting preferred in connection with the headlight spindle. Fig. 4 is a detail side view of the means employed for communicating motion from the steering bar to the headlights. Fig. 5 is a similar view from the opposite side showing the parts in section. Fig. 6 is a detail view of the operating head. Fig. 7 is a similar view of the clutch member, by which the head is coupled to the steering bar. Fig. 8 is a side view showing the clutch disconnected or disengaged from the head, and the latter locked to hold the headlights in a fixed position. Fig. 9 is a detail view of the clutch yoke.

Revolubly or loosely mounted upon the steering bar 10 is a head 11 which is adapted to be locked to the steering bar, so that it will turn therewith, by means of a clutch member 12 keyed as at 13 upon the steering bar and having a clutch face 14 provided with a rib or similar device for engagement with a recess or groove 15 in the head, said recessed or grooved portion of the head constituting a complementary clutch face.

The head is adapted when keyed or locked to the steering bar to operate an arm 16 which in the construction illustrated is one arm of a bell crank lever 17, the other arm 18 of said lever being slotted as at 19 for the engagement of a pin 20 on the head.

In order that the directing means for the light may be used or not as preferred, a shifting rod 21 terminating in a position accessible to the driver of the vehicle is provided with a yoke 22 engaging a groove 23 in the clutch member, and also carried by the shifting rod is a locking member 24, which, when the clutch member is out of engagement with the head, engages a socket or recess 25 in said head as shown clearly in Figs. 5 and 8.

The arm 16 may be connected in any suitable manner as by a rod or wire 26 with an arm 27 on the spindle 28 of one of the lamps 29. The lamp spindles are also preferably provided with arms 30 or the equivalents thereof connected by a lamp rod 31 to insure simultaneous and corresponding movement of the two lamps. Also preferably the spindles of the lamps are mounted in bearings 32 supported by brackets 33 and having antifriction means consisting of the upper and lower cones 34 and 35, and balls 36 interposed between said cones and the cone-shaped cavities of the bearings. Adjusting and jam nuts 37 and 38 or any other suitable means may be employed for taking up lost motion and insuring the proper mounting of the spindles without permitting rattling.

What is claimed is:—

1. Means for operating dirigible headlights, consisting of a rotary head operatively connected with said lights, a clutch member mounted upon a steering bar for engagement with said head, and a shifting rod for moving said clutch member and provided with means for effecting a locking engagement with the head.

2. In an apparatus for controlling dirigible headlights, the combination with a steering bar, of a head revolubly mounted thereon, a clutch member keyed upon the steering bar and adapted for engagement with said head, an arm actuated by the head and connected with the dirigible headlights, and a shifting rod for movement of the clutch member carrying a locking member for engagement with a recess in said head.

3. In an apparatus for operating dirigible lights, the combination with a steering bar, of a head revolubly mounted upon said bar, a clutch member keyed upon the steering bar, a bell crank lever having one of its arms connected with the said lights and its other arm in operative engagement with the head, a shifting rod having a yoke engaged with the clutch member for movement thereof into and out of engagement with the head, and a locking member carried by the shifting rod for engagement with a socket or recess in the head.

In testimony that I claim the foregoing as my own, I have hereto affixed my signature in the presence of two witnesses.

ELMER L. McCASLIN.

Witnesses:
CHAS. F. McADAMS,
B. H. TIPTON.